(12) United States Patent
Takano et al.

(10) Patent No.: US 9,141,245 B2
(45) Date of Patent: Sep. 22, 2015

(54) ELECTRONIC DEVICE AND COORDINATE DETECTING METHOD

(71) Applicant: Panasonic Intellectual Property Corporation of America, Torrance, CA (US)

(72) Inventors: Tomoki Takano, Kanagawa (JP); Takeshi Yamaguchi, Kanagawa (JP); Yuuichi Takizawa, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 0 days.

(21) Appl. No.: 14/174,994

(22) Filed: Feb. 7, 2014

(65) Prior Publication Data

US 2015/0042603 A1 Feb. 12, 2015

(30) Foreign Application Priority Data

Aug. 8, 2013 (JP) ................................. 2013-164960

(51) Int. Cl.
*G06F 3/044* (2006.01)
*G06F 3/041* (2006.01)

(52) U.S. Cl.
CPC .............. *G06F 3/044* (2013.01); *G06F 3/0414* (2013.01); *G06F 3/0416* (2013.01); *G06F 2203/04101* (2013.01)

(58) Field of Classification Search
CPC .................. G06F 3/044; G06F 3/0414; G06F 2203/04101
USPC ......................................................... 345/174
See application file for complete search history.

(56) References Cited

U.S. PATENT DOCUMENTS 5,541,372 A 7/1996 Baller et al.
6,492,979 B1 12/2002 Kent et al.
(Continued)

FOREIGN PATENT DOCUMENTS

EP 2426580 A2 3/2012
JP 05-173695 A 7/1993
(Continued)

OTHER PUBLICATIONS

Extended European Search Report for Application No. 14170261.3-1507/2835725 dated Mar. 3, 2015.
(Continued)

*Primary Examiner* — Kumar Patel
*Assistant Examiner* — Vinh Lam
(74) *Attorney, Agent, or Firm* — Pearne & Gordon LLP

(57) ABSTRACT

Disclosed is an electronic device including: a display section that displays information; an electrostatic-capacitance touch panel layer that allows visible light corresponding to display contents of the display section to pass through the touch panel layer and that determines a two-dimensional coordinate indicated by an indicator having conductivity; glass that protects the touch panel layer and that allows visible light corresponding to display contents of the display section to pass through the glass; a depression sensor that detects deformation of the glass; and a control section that validates a two-dimensional coordinate when a plurality of two-dimensional coordinates are determined by the touch panel layer and when deformation is detected by the depression sensor, the two-dimensional coordinate being determined last among the plurality of two-dimensional coordinates.

11 Claims, 15 Drawing Sheets

(56) References Cited

U.S. PATENT DOCUMENTS

| | | |
|---|---|---|
| 7,609,178 B2 | 10/2009 | Son et al. |
| 8,780,075 B2 | 7/2014 | Yamano et al. |
| 2006/0244733 A1 | 11/2006 | Geaghan |
| 2007/0257821 A1 | 11/2007 | Son et al. |
| 2009/0065267 A1 | 3/2009 | Sato |
| 2011/0050629 A1 | 3/2011 | Homma et al. |
| 2011/0157087 A1* | 6/2011 | Kanehira et al. ............. 345/174 |
| 2012/0056848 A1* | 3/2012 | Yamano et al. ............. 345/174 |
| 2012/0287054 A1* | 11/2012 | Kuo et al. ..................... 345/173 |
| 2013/0181941 A1 | 7/2013 | Okuno |
| 2013/0306459 A1* | 11/2013 | Anno ............................ 200/600 |
| 2013/0342501 A1 | 12/2013 | Molne et al. |
| 2014/0085253 A1* | 3/2014 | Leung et al. ................. 345/174 |
| 2014/0354585 A1* | 12/2014 | Cok et al. ..................... 345/174 |

FOREIGN PATENT DOCUMENTS

| | | |
|---|---|---|
| JP | 11-212725 A | 8/1999 |
| JP | 2006-323457 A | 11/2006 |
| JP | 2009-87311 A | 4/2009 |
| JP | 2009-087311 A | 4/2009 |
| JP | 2009-181232 A | 8/2009 |
| JP | 2010-272143 A | 12/2010 |
| JP | 2011-053971 A | 3/2011 |
| JP | 2011-096271 A | 5/2011 |

OTHER PUBLICATIONS

Office action for U.S. Appl. No. 14/451,576 dated Apr. 2, 2015.

* cited by examiner

ELECTRONIC DEVICE AND COORDINATE DETECTING METHOD

CROSS REFERENCE TO RELATED APPLICATIONS

This application is entitled and claims the benefit of Japanese Patent Application No. 2013-164960, filed on Aug. 8, 2013, the disclosure of which including the specification, drawings and abstract is incorporated herein by reference in its entirety.

TECHNICAL FIELD

The present invention relates to an electronic device provided with a touch panel and also to a coordinate detecting method.

BACKGROUND ART

Electronic devices each provided with a touch panel, such as smartphones and tablets have been widespread. Such electronic devices include those provided with an electrostatic-capacitance touch panel, which can accept not only "touch operation" performed by finger(s) of a bare hand directly touching the surface of the touch panel, but also "hover operation" performed by the finger at a predetermined height from the surface of the touch panel without the finger of the bare hand touching the surface of the touch panel. Accordingly, the user can perform operation not only with a bare hand but also with a hand in a glove.

FIG. 19 schematically shows an example of configuration of an electrostatic-capacitance touch panel. In FIG. 19, transmission electrode 101 and reception electrode 102 are arranged apart from each other on a lower face of plate-like dielectric body 100. A drive pulse is applied to transmission electrode 101 from drive buffer 103 to generate an electric field. When a finger enters this electric field, the number of lines of electric force between transmission electrode 101 and reception electrode 102 decreases. This change in the lines of electric force appears as a change in electrical charge in reception electrode 102. Approach of a finger to the touch panel is detected from the change in the electrical charge in reception electrode 102.

FIGS. 20A-20C show states where the fingers are detected when the fingers are gradually brought into proximity to an electrostatic-capacitance touch panel. FIG. 20A shows a state where the fingers do not enter an electric field, that is, the fingers are not detected. FIG. 20B shows a state where the fingers enter the electric field, but do not touch the touch panel, that is, hover operation is detected. FIG. 20C shows a state where the fingers enter the electric field and touch the touch panel, that is, touch operation is detected. It should be noted that operation performed by the fingers in a glove touching the touch panel corresponds to the state shown in FIG. 20B because the fingers do not directly touch the touch panel.

As the related art relating to such an electrostatic-capacitance touch panel, for example, Japanese Patent Application Laid-Open No. 2011-53971 (hereinafter, referred to as "PTL 1") discloses an information processing apparatus (hereinafter, referred to as "related art 1"). Related art 1 is an information processing apparatus configured to detect a degree of proximity of the fingers with respect to the touch panel and a value of pressure applied to the touch panel and to distinguish between touch operation and hover operation according to whether or not the degree of proximity and the value of pressure satisfy predetermined conditions.

Further, as another related art relating to the electrostatic-capacitance touch panel, for example, Japanese Patent Application Laid-Open No. 2009-181232 (hereinafter, referred to as "PTL 2") discloses a touch switch (hereinafter, referred to as "related art 2"). The touch switch according to related art 2 is configured to determine that "there is touch operation" when a detection value in the touch panel exceeds a first threshold and to determine that "there is hover operation" when a predetermined time period elapses in a state where the detection value in the touch panel is equal to or less than the first threshold but exceeds a second threshold.

CITATION LIST

Patent Literature

PTL 1
Japanese Patent Application Laid-Open No. 2011-53971
PTL 2
Japanese Patent Application Laid-Open No. 2009-181232

SUMMARY OF INVENTION

Technical Problem

The electrostatic-capacitance touch panel detects a very small change in a capacitance value in order to detect hover operation. However, because a change in the capacitance value detected when a water droplet (as an example of a conductive material) adheres to the touch panel is similar to a change in the capacitance value detected when hover operation is actually performed for the touch panel, there is a possibility that when a water droplet adheres to the touch panel due to rainfall or the like, this adhesion may erroneously be detected as an executed hover operation.

Because the above related art 1 equally determines operation to be hover operation when a value of pressure applied by a finger approaching the touch panel is not greater than a predetermined value, it is impossible to distinguish between adhesion of a water droplet and the hover operation. Accordingly, in the above related art 1, when a water droplet adheres to the touch panel, there may be a case where the coordinates of the position to which the water droplet adheres are validated, which may result in an erroneous detection.

Meanwhile, the above related art 2 determines whether operation is touch operation or hover operation, as well as whether the operation is actual hover operation or adhesion of a water droplet. However, in related art 2, because unless hover operation continues for a certain period of time, the operation is not determined to be actual hover operation, when hover operation does not continue for a sufficient period of time, there may be a case where the operation is erroneously detected as adhesion of a water droplet.

Therefore, an object of the present invention is to provide an electronic device and a coordinate detecting method which allow operation without erroneous detection not only with a bare hand but also with a hand in a glove when a conductive material adheres to a touch panel.

Solution to Problem

An electronic device according to an aspect of the present invention includes: a housing; a display section that is disposed inside the housing and that displays predetermined information; an electrostatic-capacitance touch panel section that allows visible light corresponding to display contents of the display section to pass through the touch panel section and that determines a two-dimensional coordinate indicated by an indicator having predetermined conductivity; a transparent member that protects the touch panel section and that allows visible light corresponding to display contents of the display section to pass through the transparent member; a depression detecting section that detects deformation of the transparent member; and a control section that validates a two-dimensional coordinate when a plurality of two-dimensional coordinates are determined by the touch panel section and when a predetermined amount of deformation is detected by the depression detecting section, the two-dimensional coordinate being determined last among the plurality of two-dimensional coordinates.

A coordinate detecting method according to an aspect of the present invention is a method for an electronic device that includes: a housing; a display section that is disposed inside the housing and that displays predetermined information; an electrostatic-capacitance touch panel section that allows visible light corresponding to display contents of the display section to pass through the touch panel section and that determines a two-dimensional coordinate indicated by an indicator having predetermined conductivity; a transparent member that protects the touch panel section and that allows visible light corresponding to display contents of the display section to pass through the transparent member; and a depression detecting section that detects deformation of the transparent member, the method including validating a two-dimensional coordinate when a plurality of two-dimensional coordinates are determined by the touch panel section and when a predetermined amount of deformation is detected by the depression detecting section, the two-dimensional coordinate being determined last among the plurality of two-dimensional coordinates.

Advantageous Effects of Invention

According to the present invention, it is possible to operate a touch panel without erroneous detection not only with a bare hand but also with a hand in a glove in a state where a conductive material adheres to the touch panel.

DESCRIPTION OF EMBODIMENTS

An embodiment of the present invention will be described in detail below with reference to the accompanying drawings.

Figure 1:
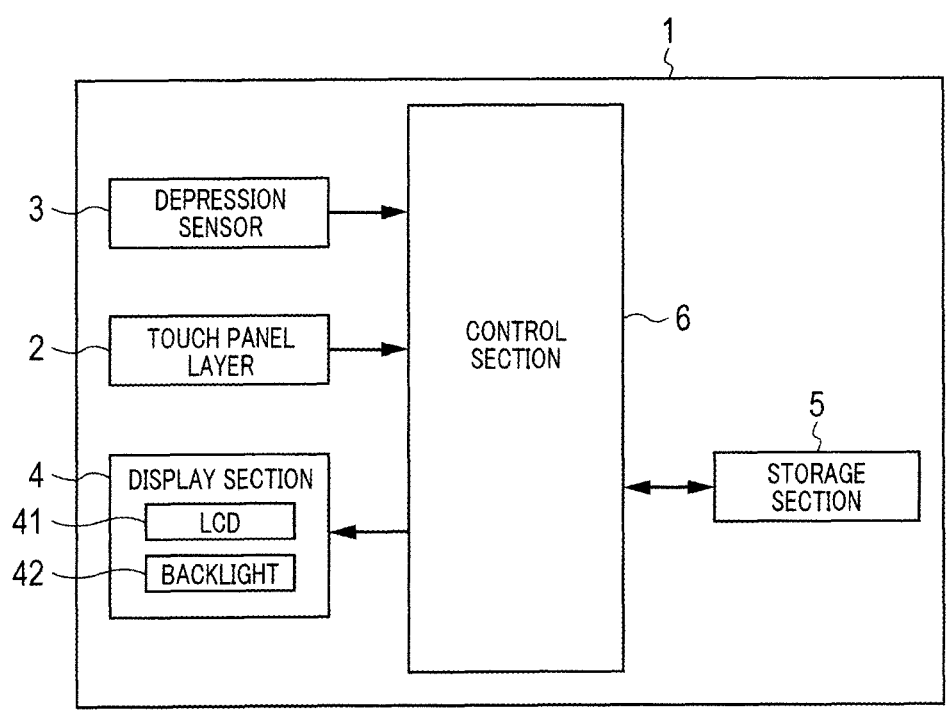
FIG. 1 is a block diagram showing an example of a schematic configuration of an electronic device according to an embodiment of the present invention.

FIG. 1 is a block diagram showing an example of a schematic configuration of electronic device 1 according to the embodiment.

In FIG. 1, electronic device 1 includes touch panel layer 2, depression sensor 3, display section 4, storage section 5 and control section 6. Electronic device 1 is, for example, a smartphone or a tablet.

Touch panel layer 2, which employs an electrostatic capacitance system, can receive touch operation as well as hover operation. The touch operation is, as described above, operation performed by an indicator directly touching a touch panel surface. Meanwhile, the hover operation is, as described above, operation performed by an indicator at a predetermined height from the touch panel surface without the indicator directly touching the touch panel surface. Examples of the hover operation include operation performed by a finger in a glove touching the touch panel surface. The indicator is a finger of the human or an object having electric conductivity (such as a stylus pen). The description will be provided below assuming that the indicator is a finger. Further, the touch panel surface is a face which receives user operation in touch panel layer 2.

Figure 19:
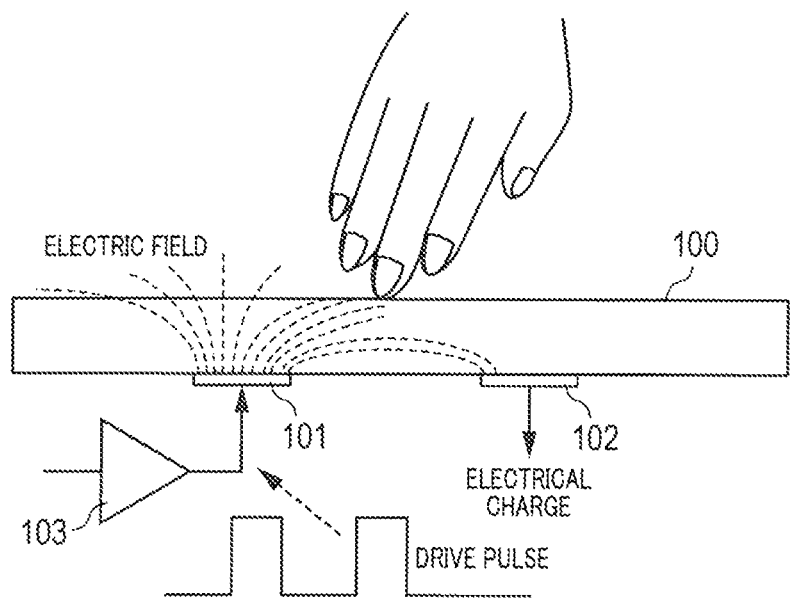
FIG. 19 shows a schematic configuration of a conventional electrostatic-capacitance touch panel.
Figures 20A, 20B, 20C:
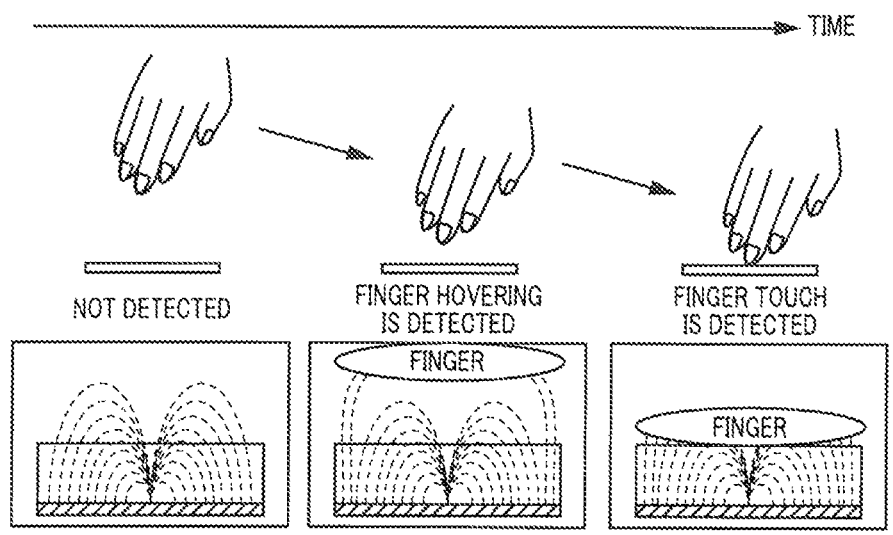
FIGS. 20A, 20B and 20C illustrate finger detection states when a hand is gradually brought into proximity with a touch panel.

As shown in FIG. 19, touch panel layer 2 includes transmission electrode 101 and reception electrode 102 which are arranged apart from each other on a lower face of plate-like dielectric body 100. A drive pulse based on a transmission signal is applied to transmission electrode 101. The application of the drive pulse to transmission electrode 101 generates an electric field from transmission electrode 101. If a finger enters this electric field, the number of lines of electric force between transmission electrode 101 and reception electrode 102 decreases, and this change in the number appears as a change in electrical charge in reception electrode 102.

Touch panel layer 2 (an example of a touch panel section) determines the number of the fingers, two-dimensional coordinates (x, y) indicated by the finger in display section 4, and a vertical distance (z) between a surface of touch panel layer 2 and the finger based on a received signal according to the change in electrical charge in reception electrode 102, and outputs information showing these to control section 6. It should be noted that the determination described here is performed at a touch panel control section (not shown) included in touch panel layer 2.

Figure 2:
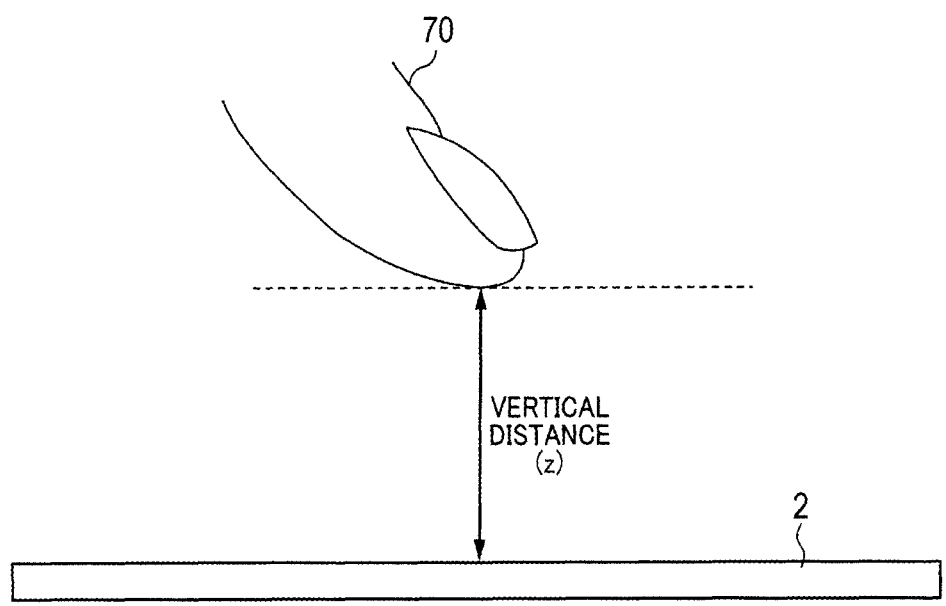
FIG. 2 shows an example of a positional relationship between a touch panel layer and the finger in the electronic device according to an embodiment of the present invention.

The vertical distance (z) is, as shown in FIG. 2, a distance between the touch panel surface of touch panel layer 2 and finger 70. Finger 70 is one finger of a bare hand. If this vertical distance (z) is equal to or less than a predetermined value, touch panel layer 2 can determine the two-dimensional coordinates (x, y). It should be noted that although not shown in FIG. 2, glass (an example of a transparent member, glass 11 which will be described, hereinafter) for protecting touch panel layer 2 is provided on the touch panel surface.

Depression sensor 3 (an example of a depression detecting section) detects deformation (a predetermined amount of deformation) of the glass provided for protecting touch panel layer 2 and outputs a signal showing whether or not the glass is deformed to control section 6. It is assumed that the glass is deformed by being depressed by the indicator and is not deformed by adhesion of a water droplet, or the like. It should be noted that it is not necessarily required to use the signal showing whether or not the glass is deformed (i.e., showing the both of a state where the glass is deformed and a state where the glass is not deformed), but it is also possible to use a signal which shows either a state where the glass is deformed or a state where the glass is not deformed. Further, instead of depression sensor 3 itself determining whether or not the glass is deformed, depression sensor 3 may output a signal showing a degree of deformation of the glass to control section 6 and control section 6 may determine whether or not the glass is deformed.

Figure 3:
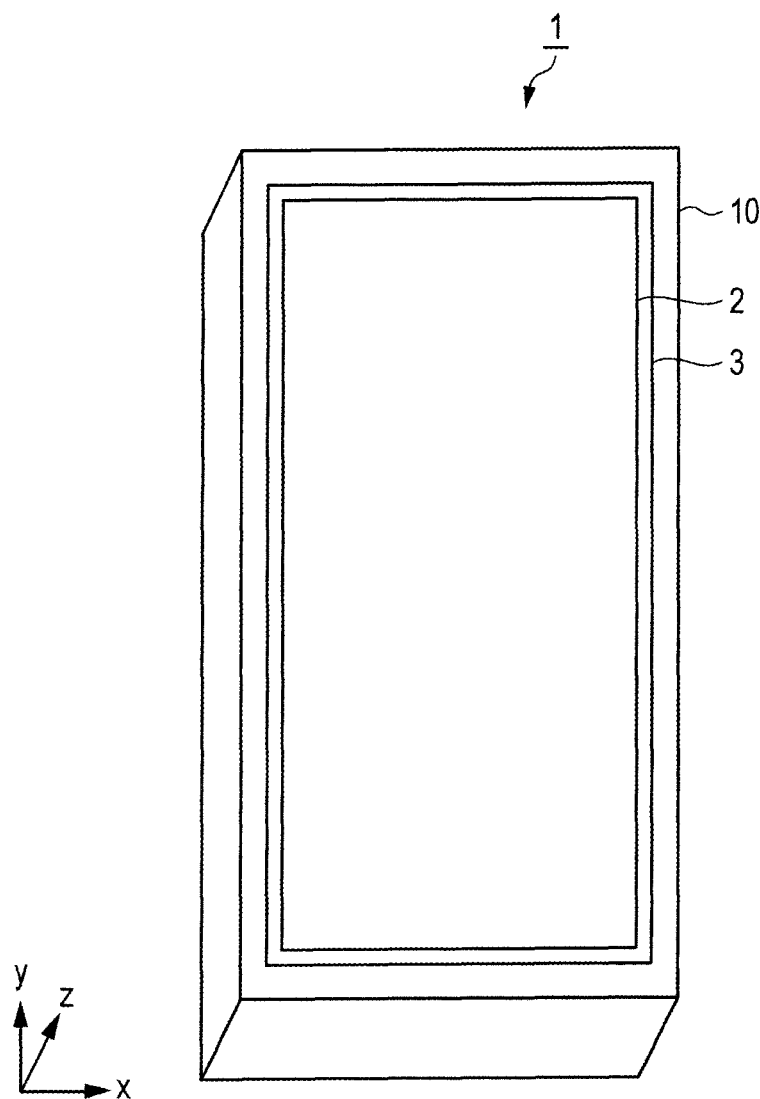
FIG. 3 is a perspective view showing an example of appearance of a front face of the electronic device according to an embodiment of the present invention.

Arrangement of touch panel layer 2 and depression sensor 3 will be described below. As shown in FIG. 3, electronic device 1 has cuboid housing 10. In FIG. 3, at a front face side of this housing 10, touch panel layer 2 and depression sensor 3 are arranged. Touch panel layer 2 and depression sensor 3 are each formed in a rectangle which is vertically long in a plane view and are smaller in area than the front face of housing 10. While in FIG. 3, the area of depression sensor 3 is slightly larger than the area of touch panel layer 2, the area of depression sensor 3 may be smaller than the area of touch panel layer 2 as will be described later. Touch panel layer 2 is stacked on top of depression sensor 3 so that touch panel layer 2 is disposed at a front face side of depression sensor 3.

Although not shown in FIG. 3, the glass for protecting touch panel layer 2 is provided at the front face side (i.e., the touch panel surface) of touch panel layer 2 as described above. Further, in depression sensor 3, rectangular display section 4 which is vertically long in a plane view is disposed at a back side of the surface on which touch panel layer 2 is stacked.

Display section 4, which is an apparatus disposed inside housing 10 and displays predetermined information based on an instruction from control section 6, has LCD (Liquid Crystal Display) 41 and backlight 42. It should be noted that display section 4 may include a device such as an organic EL (Electro Luminescence) or electronic paper display in place of LCD 41.

Figure 4A:
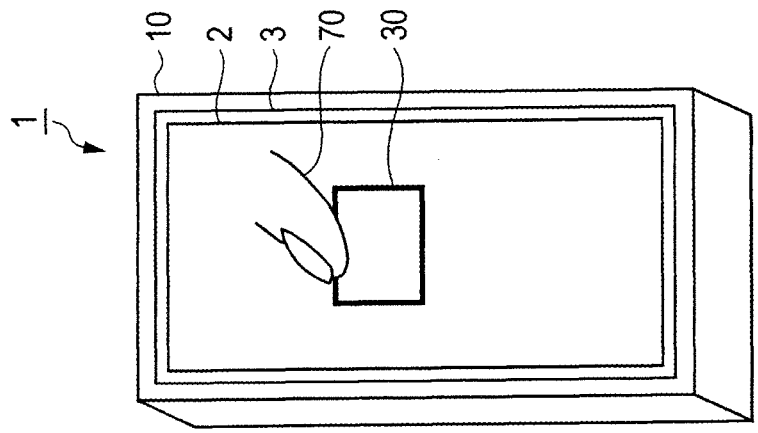
FIG. 4A shows an example of an icon displayed in the electronic device according to an embodiment of the present invention.
Figure 4B:
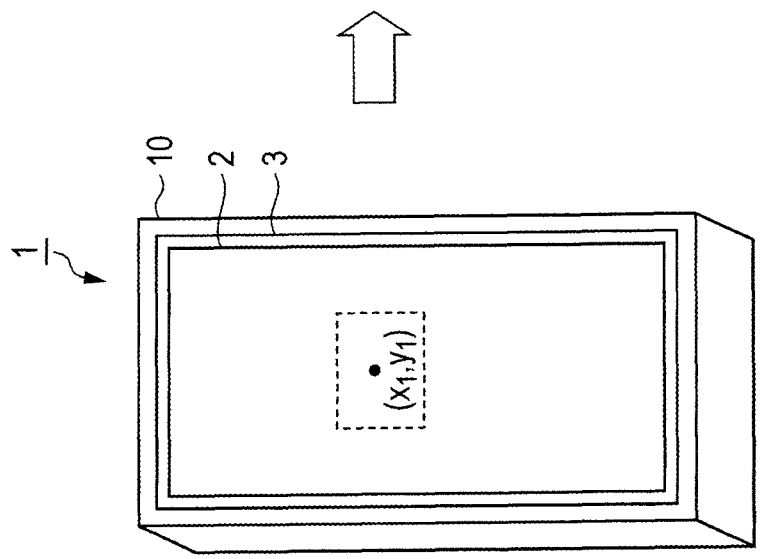
FIG. 4B shows an example of an icon displayed in the electronic device according to an embodiment of the present invention.

Display section 4 displays a predetermined image (for example, pointer, icon, or the like) as a display operation corresponding to the two-dimensional coordinates (x, y) determined in touch panel layer 2. For example, when the two-dimensional coordinates $(x_1, y_1)$ are effective coordinates as shown in FIG. 4A, icon 30 is displayed as shown in FIG. 4B. It should be noted that it is also possible to display a pointer (not shown) corresponding to the two-dimensional coordinates (x, y) in FIG. 4B. In this case, it is also possible to put icon 30 into a selectable state when the pointer overlaps icon 30. Further, it is also possible to activate a function corresponding to icon 30 when finger 70 approaches touch panel layer 2 within a predetermined vertical distance (z) (including zero). The display operation of the pointer and icon 30, and activation of the function corresponding to icon 30 as described above are performed by the instruction from control section 6.

Figure 5:
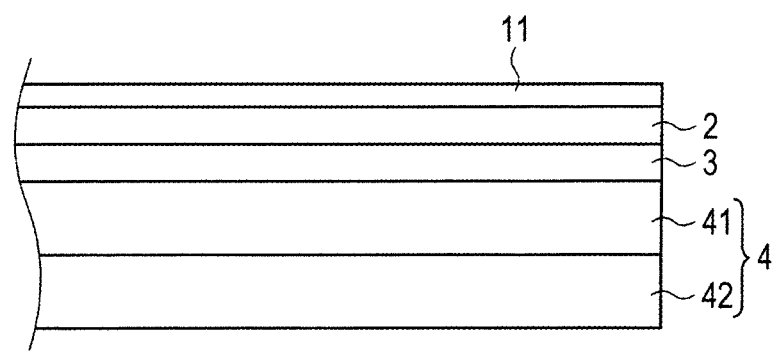
FIG. 5 is a sectional side view showing arrangement example 1 of glass, a touch panel layer, a depression sensor and a display section in the electronic device according to an embodiment of the present invention.

Arrangement example 1 of touch panel layer 2, depression sensor 3 and display section 4 in electronic device 1 will be described. In FIG. 5, glass 11 for protecting touch panel layer 2 is disposed at the front face side of touch panel layer 2 while being overlapped with touch panel layer 2 as described above. Glass 11 and touch panel layer 2 each have a sheet shape and have predetermined transmittance of visible light and allow visible light to pass through a display region of display section 4 to transmit through glass 11 and touch panel layer 2. Further, at least part of glass 11 is disposed so as to be exposed from housing 10, while the other part is disposed inside housing 10. It should be noted that glass 11 may be integrated with touch panel layer 2.

In FIG. 5, in touch panel layer 2, depression sensor 3 is disposed at the back side of the surface on which glass 11 is stacked as described above. Further, as described above, LCD 41 and backlight 42 forming display section 4 are arranged in that order at the back side of the surface on which touch panel layer 2 is stacked on depression sensor 3. Because depression sensor 3 is disposed at the front face side of display section 4 while being overlapped with display section 4 in this way, depression sensor 3 needs to be transparent and have permeability that allows visible light to pass through depression sensor 3 as with glass 11 and touch panel layer 2. It should be noted that depression sensor 3 may be integrated with touch panel layer 2.

Returning to FIG. 1, storage section 5, which has a volatile memory such as a DRAM (Dynamic Random Access Memory), stores settings when a user performs various settings on electronic device 1.

Control section 6, which controls each component of electronic device 1, includes a CPU (Central Processing Unit), a ROM (Read Only Memory), a RAM (Random Access Memory) and an interface circuit. The ROM stores a program for controlling the CPU, and the RAM is used as an operation area while the CPU operates.

In this embodiment, control section 6 performs coordinate determination processing based on input information from depression sensor 3 and touch panel layer 2. This coordinate determination processing will be described later using FIG. 6A to FIG. 6C, FIG. 7 and FIG. 8.

The coordinate determination processing performed by control section 6 will be described below as an operation example of electronic device 1 according to this embodiment.

First, a specific example of the coordinate determination processing will be described with reference to FIG. 6A to FIG. 6C.

Figure 6A:
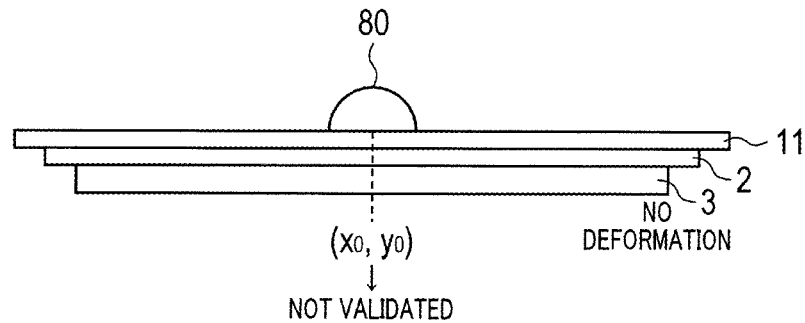
FIG. 6A shows an example of coordinate determination when the touch panel layer detects water and/or the finger in the electronic device according to an embodiment of the present invention.

As shown in FIG. 6A, it is assumed that water droplet 80 adheres to glass 11 due to rainfall, or the like. At this time, touch panel layer 2 outputs two-dimensional coordinates ($x_0$, $y_0$) of a position to which water droplet 80 adheres to control section 6. Further, depression sensor 3 outputs a signal showing that glass 11 is not deformed (hereinafter, referred to as a "no deformation signal") to control section 6. Because of reception of the no deformation signal, control section 6 does not validate the two-dimensional coordinates ($x_0$, $y_0$). The term "validation" means that the two-dimensional coordinates are treated as effective coordinates. Accordingly, processing for the two-dimensional coordinates ($x_0$, $y_0$) (for example, a display operation of information in display section 4 and the like) is not performed.

Figure 6B:
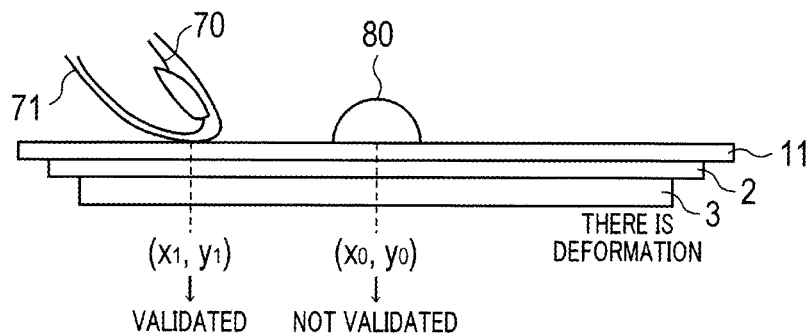
FIG. 6B shows another example of coordinate determination when the touch panel layer detects water and/or the finger in the electronic device according to an embodiment of the present invention.

After the state illustrated in FIG. 6A, as shown in FIG. 6B, it is assumed that the user performs hover operation by touching glass 11 with finger 70 in glove 71 in a state where water droplet 80 adheres to glass 11. At this time, touch panel layer 2 outputs two-dimensional coordinates ($x_1$, $y_1$) of a position contacted by glove 71 in addition to the two-dimensional coordinates ($x_0$, $y_0$) which are being output, to control section 6. Further, depression sensor 3 outputs a signal showing that glass 11 is deformed by depression by glove 71 (hereinafter, referred to as a "deformation signal") to control section 6. By receiving the deformation signal, control section 6 validates only the two-dimensional coordinates ($x_1$, $y_1$) which are received temporally later. Accordingly, processing for the two-dimensional coordinates ($x_1$, $y_1$) is performed.

Figure 6C:
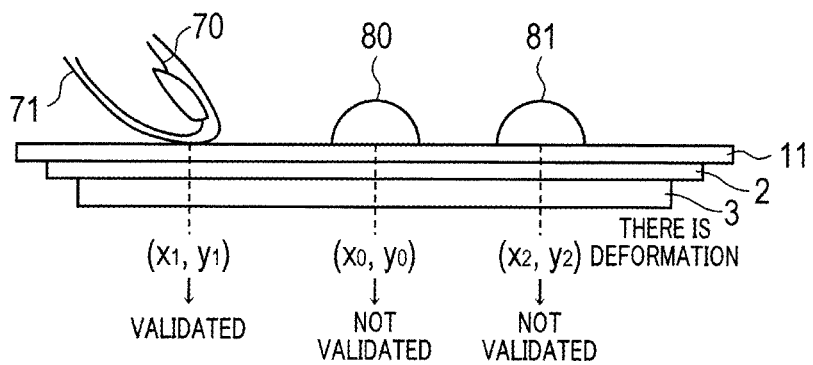
FIG. 6C shows still another example of coordinate determination when the touch panel layer detects water and/or the finger in the electronic device according to an embodiment of the present invention.

After the state illustrated in FIG. 6B, as shown in FIG. 6C, it is assumed that water droplet 81 adheres to glass 11 in a state where water droplet 80 adheres to glass 11 and the user performs hover operation by touching glass 11 with finger 70 in glove 71. At this time, touch panel layer 2 outputs two-dimensional coordinates ($x_2$, $y_2$) of a position to which water droplet 81 adheres in addition to the two-dimensional coordinates ($x_0$, $y_0$) and ($x_1$, $y_1$) which are being output, to control section 6. Further, depression sensor 3 is outputting the deformation signal to control section 6 by the pressure by the hover operation. Although control section 6 receives the deformation signal, because control section 6 has already validated the two-dimensional coordinates ($x_1$, $y_1$), control section 6 does not validate the two-dimensional coordinates ($x_2$, $y_2$) which are received temporally later. Accordingly, while the processing for the two-dimensional coordinates ($x_1$, $y_1$) is performed, processing for the two-dimensional coordinates ($x_2$, $y_2$) is not performed. In this way, when the validated two-dimensional coordinates already exist, control section 6 does not validate new two-dimensional coordinates even if depression sensor 3 detects deformation of glass 11.

It should be noted that in FIG. 6A to FIG. 6C, the two-dimensional coordinates by adhesion of water droplets 80 and 81 and contact by glove 71 may remain still or may move. Further, control section 6 maintains the validation until release of the two-dimensional coordinates which have been validated once is detected. The term "release" refers to a state where the indicator moves away from touch panel layer 2 and the value of the vertical distance (z) is equal to or greater than a predetermined value. Release is detected when the two-dimensional coordinates are no longer received. While the validation is maintained, depression sensor 3 may output either a deformation signal or a no deformation signal to control section 6. Further, control section 6 receives the number of indicators and the vertical distance together with the two-dimensional coordinates from touch panel layer 2. Hereinafter, information including the two-dimensional coordinates, the number of indicators and the vertical distance is referred to as "coordinate information."

The first example of the coordinate determination processing will be described using FIG. 7.

In step S101, control section 6 checks a deformation detection state of depression sensor 3 (i.e., whether depression sensor 3 detects deformation or no deformation of glass 11) based on the signal from depression sensor 3.

When receiving the no deformation signal from depression sensor 3, control section 6 determines that glass 11 is not deformed (step S102: NO), and the process returns to step S101. Meanwhile, when receiving the deformation signal from depression sensor 3, control section 6 determines that glass 11 is deformed (step S102: YES), and the process proceeds to step S103.

In step S103, control section 6 checks a two-dimensional coordinate determination state of touch panel layer 2 (i.e., whether touch panel layer 2 is determining a two-dimensional coordinate) based on information from touch panel layer 2.

When not receiving coordinate information from touch panel layer 2, control section 6 determines that two-dimensional coordinates are not being determined (step S104: NO), the process returns to step S101. Meanwhile, when receiving coordinate information from touch panel layer 2, control section 6 determines that two-dimensional coordinates are being determined (step S104: YES), and the process proceeds to step S105.

In step S105, control section 6 validates the two-dimensional coordinates which are determined last. The two-dimensional coordinates validated in this step are two-dimensional coordinates indicated by the latest coordinate information received by control section 6 at this moment.

In step S106, control section 6 tracks the validated two-dimensional coordinates.

In step S107, control section 6 determines whether or not release of the validated two-dimensional coordinate is detected. The term "release" refers to a state where the indicator indicating the validated two-dimensional coordinates moves away from the touch panel surface and the vertical distance (z) becomes equal to or greater than a predetermined value.

When receiving the coordinate information of the validated two-dimensional coordinates from touch panel layer 2, control section 6 determines that release is not detected (step S107: NO), and the process returns to step S106. Meanwhile, when control section 6 no longer receives the coordinate information of the validated two-dimensional coordinate from touch panel layer 2, control section 6 determines that release is detected (step S107: YES), and the process returns to step S101.

That is, when control section 6 validates the two-dimensional coordinates, control section 6 maintains the validated state of the two-dimensional coordinates unless release is detected even if the two-dimensional coordinates change. Further, control section 6 does not validate any two-dimensional coordinates indicated by the coordinate information newly received while the validation is maintained, regardless of detection results of deformation.

The second example of the coordinate determination processing will be described using FIG. 8. While the above-described first example is processing for validating only one set of two-dimensional coordinates, the second example is processing for validating a plurality of sets of two-dimensional coordinates in order to support operation by a plurality of indicators (for example, multi-touch). It should be noted that because steps S201 to S204 in FIG. 8 are the same as steps S101 to S104 in FIG. 7, the description of the steps will be omitted.

In step S205, control section 6 validates all the two-dimensional coordinates determined within a predetermined time period. Accordingly, the two-dimensional coordinates validated in this step are two-dimensional coordinates indicated by all the coordinate information received by control section 6 within the predetermined time period. The predetermined time period is a time period (for example, a few seconds) including a time point when deformation is detected last (a deformation signal is received). Examples of the predetermined time period include the following (1) to (3):

(1) a time period from a starting point which is before a time point when deformation is detected last (hereinafter, referred to as a "deformation detecting time point") until the deformation detecting time point;

(2) a time period from the deformation detecting time point until an end point which is after the deformation detecting time point; and (3) a time period including the deformation detecting time point from a starting point before the deformation detecting time point until an end point after the deformation detecting time point.

In step S206, control section 6 tracks all the validated two-dimensional coordinates.

In step S207, control section 6 determines whether or not release is detected for all the validated two-dimensional coordinates.

When control section 6 receives coordinate information of any of all the validated two-dimensional coordinates from touch panel layer 2, control section 6 determines that release is not detected (step S207: NO), and the process returns to step S206. Meanwhile, when control section 6 no longer receives the coordinate information of all the validated two-dimensional coordinates from touch panel layer 2, control section 6 determines that release is detected (step S207: YES), and the process returns to step S201.

That is, when control section 6 validates a plurality of sets of two-dimensional coordinates, control section 6 maintains the validated states of the sets of two-dimensional coordinates unless release of all the validated two-dimensional coordinates is detected even if each set of the two-dimensional coordinates changes. Further, control section 6 does not validate any set of two-dimensional coordinates indicated by the coordinate information newly received while the validation is maintained, regardless of detection results of deformation.

In this way, according to electronic device 1 according to this embodiment, when depression sensor 3 detects deformation while touch panel layer 2 determines two-dimensional coordinates, only the two-dimensional coordinates which are determined last by touch panel layer 2 are validated. Accordingly, it is possible to perform operation without erroneous detection not only with a bare hand but also with a hand in a glove in a state where a conductive material such as a water droplet adheres to the touch panel surface.

It should be noted that in electronic device 1 according to this embodiment, when depression sensor 3 does not detect deformation while touch panel layer 2 determines two-dimensional coordinates, it is possible to determine that a conductive material such as a water droplet adheres to the touch panel surface. In this case, electronic device 1 may display, for example, the determination result in display section 4.

Figure 7:
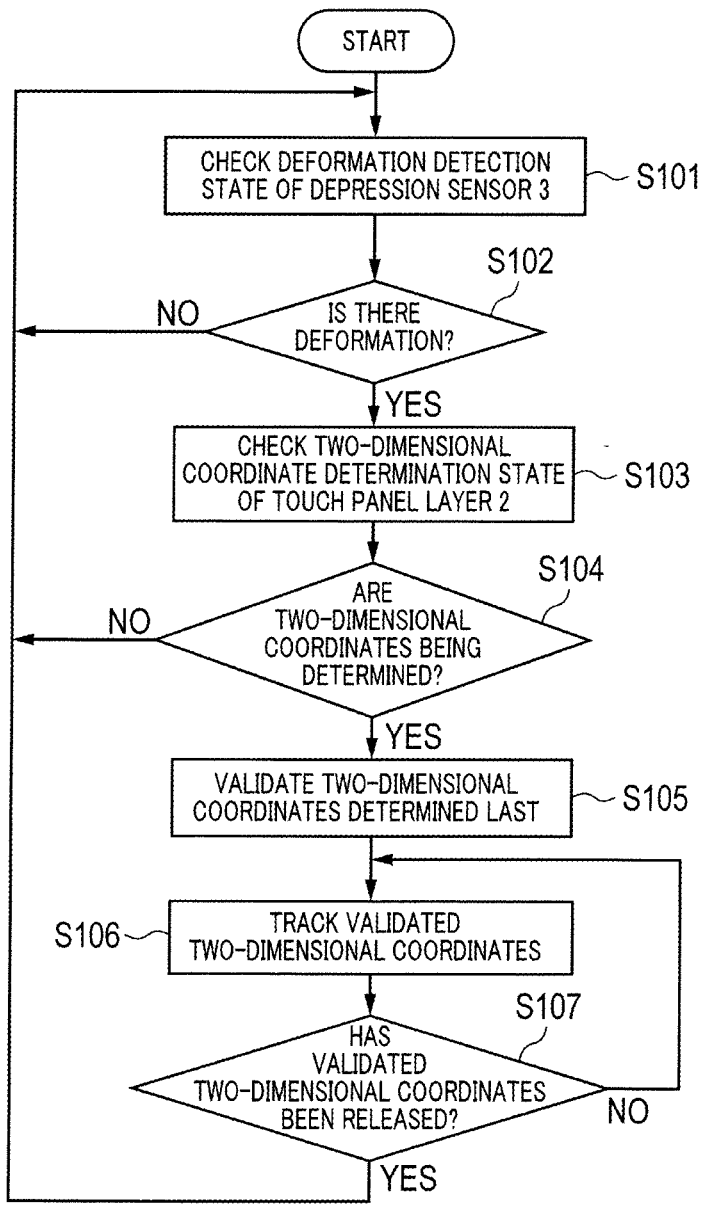
FIG. 7 is a flowchart showing a first example of coordinate determination processing of the electronic device according to an embodiment of the present invention.
Figure 8:
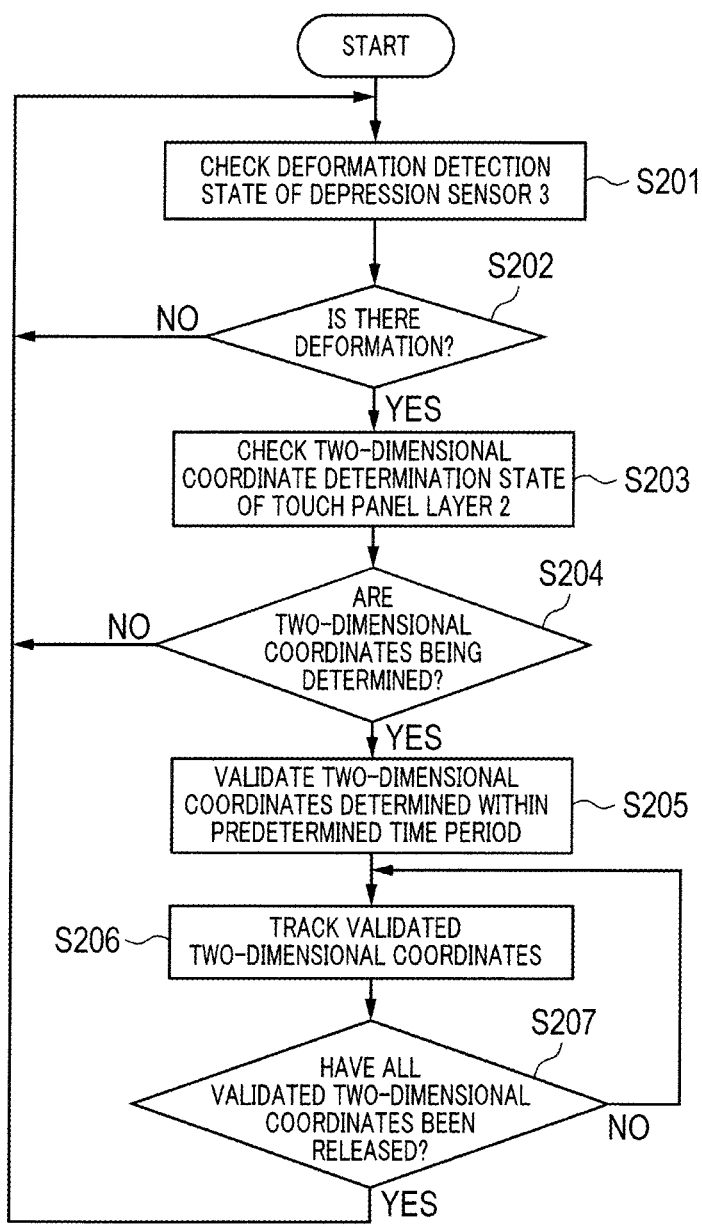
FIG. 8 is a flowchart showing a second example of coordinate determination processing of the electronic device according to an embodiment of the present invention.

Further, while in electronic device 1 according to this embodiment, a program for causing electronic device 1 to execute operation shown in the flowcharts of FIG. 7 and/or FIG. 8 is stored in, for example, a ROM (not shown) of control section 6, this program may be stored in components other than electronic device 1. For example, the program may be stored in, for example, a storage medium such as a magnetic disk, an optical disc, a magneto-optical disk, a flash memory, or a server on a network such as the Internet.

Further, while it is assumed that electronic device 1 according to this embodiment is applied to mobile terminals such as a smartphone and a tablet, apparatuses to which electronic device 1 can be applied are not limited to the mobile terminals. Electronic device 1 can be applied to, for example, home appliances (such as a microwave oven and a refrigerator), a car navigation system, an HEMS (Home Energy Management System), a BEMS (Building Energy Management System), and the like.

Further, while in electronic device 1 according to this embodiment, as shown in FIG. 5, touch panel layer 2, depression sensor 3 and display section 4 are arranged in this order under glass 11, the arrangement is not limited to this arrangement. Examples of the arrangement other than arrangement example 1 shown in FIG. 5 will be respectively described below with reference to the accompanying drawings.

Figure 9:
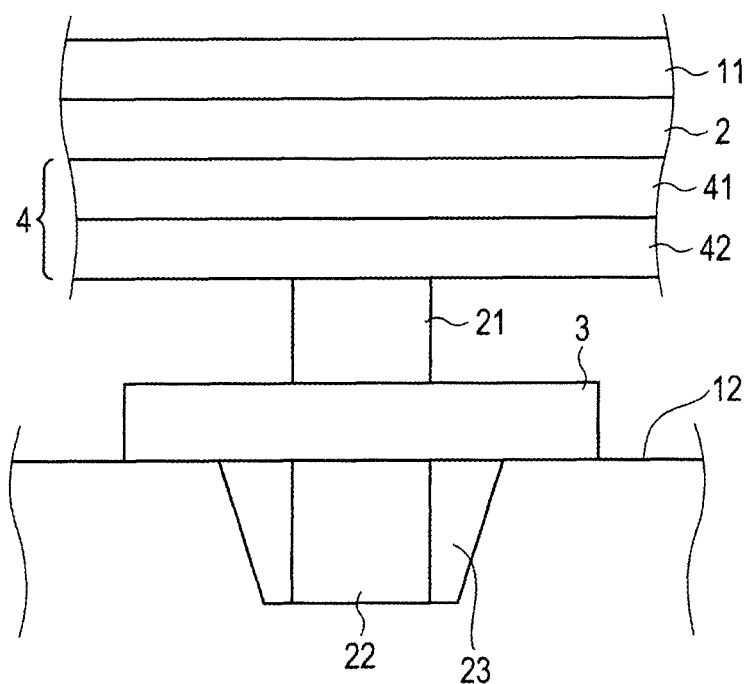
FIG. 9 shows arrangement example 2 of the glass, the touch panel layer, the depression sensor and the display section in the electronic device according to an embodiment of the present invention.

FIG. 9 is a sectional side view of electronic device 1 in arrangement example 2. As shown in FIG. 9, under glass 11, touch panel layer 2, display section 4 (LCD 41 and backlight 42), plunger 21, depression sensor 3 and elastic member 22 are arranged in this order.

In FIG. 9, plunger 21 is disposed between backlight 42 and depression sensor 3. One end of plunger 21 is in contact with a face of backlight 42, while the other end of plunger 21 is fixed to a face of depression sensor 3. Recessed portion 23 is formed at frame portion 12 (example of one portion of housing 10) of housing 10. Elastic member 22 is vertically disposed at recessed portion 23 with one end of elastic member 22 being fixed to a bottom face of recessed portion 23 and the other end being fixed to one face of depression sensor 3 (back side of the face on which plunger 21 is fixed). Further, both ends of depression sensor 3 are fixed at frame portion 12.

In the configuration of FIG. 9, when pressure is applied to glass 11 by contact of a finger (bare hand or hand in a glove) of the user, plunger 21 presses down depression sensor 3 downward (in a direction of recessed portion 23). At this time, elastic member 22 shrinks so as to absorb the pressure on depression sensor 3. When the finger of the user move away from glass 11 and the pressure on glass 11 disappears, elastic member 22 stretches to return to the original length. Accordingly, depression sensor 3 is pushed upward (in a direction of backlight 42).

Figure 10C:
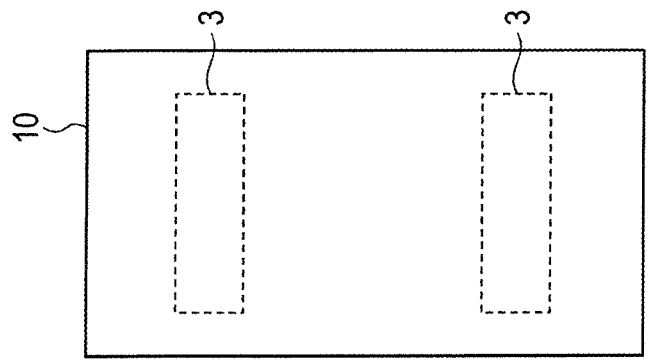
FIG. 10C shows still another arrangement example of the depression sensors in the electronic device according to an embodiment of the present invention.
Figure 10B:
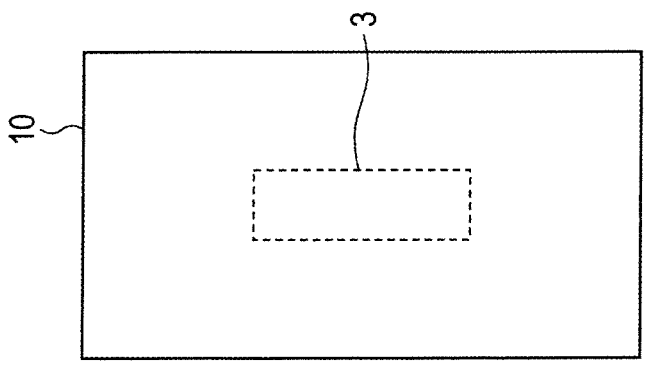
FIG. 10B shows another arrangement example of the depression sensor in the electronic device according to an embodiment of the present invention.
Figure 10A:
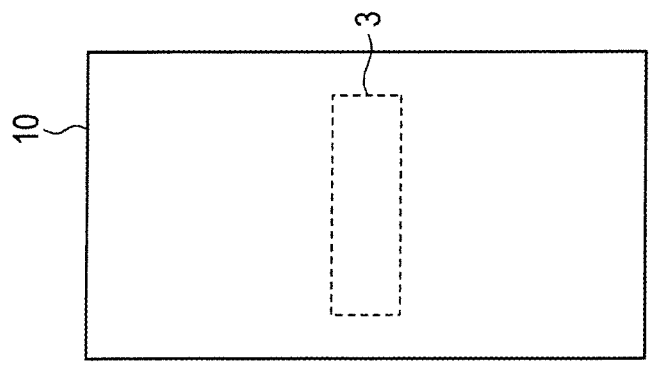
FIG. 10A shows an arrangement example of the depression sensor in the electronic device according to an embodiment of the present invention.

An example of a position where depression sensor 3 shown in FIG. 9 is disposed in electronic device 1 is shown in FIG. 10A to FIG. 10C. FIG. 10A, FIG. 10B and FIG. 10C each show a state where depression sensor 3 is disposed in the front face of housing 10 of electronic device 1. It should be noted that while depression sensor 3 shown in FIG. 10A to FIG. 10C has a rectangular shape, depression sensor 3 shown in FIG. 10A to FIG. 10C is considerably smaller in area than depression sensor 3 shown in FIG. 3, FIG. 4A and FIG. 4B.

FIG. 10A shows an example where depression sensor 3 is disposed in the center of housing 10. In FIG. 10A, depression sensor 3 is disposed so that a long side of depression sensor 3 is parallel to a short side of housing 10. FIG. 10B shows an example where depression sensor 3 is arranged in the center of housing 10. In FIG. 10B, depression sensor 3 is disposed so that a long side of depression sensor 3 is parallel to a long side of housing 10. FIG. 10C shows an example where two depression sensors 3 are respectively arranged near the short sides of housing 10. In FIG. 10C, each of two depression sensors 3 is disposed so that a long side of depression sensor 3 is parallel to a short side of housing 10.

Among three examples shown in FIG. 10A to FIG. 10C, the placement of depression sensor 3 shown in FIG. 10A can detect most deformation and can be realized at low cost. It should be noted that the positions where depression sensor 3 is disposed and the number of depression sensors 3 are not limited to the examples shown in FIG. 10A to FIG. 10C. For example, it is also possible to arrange four depression sensors 3 so as to be placed along all the four sides of housing 10, respectively.

Figure 11:
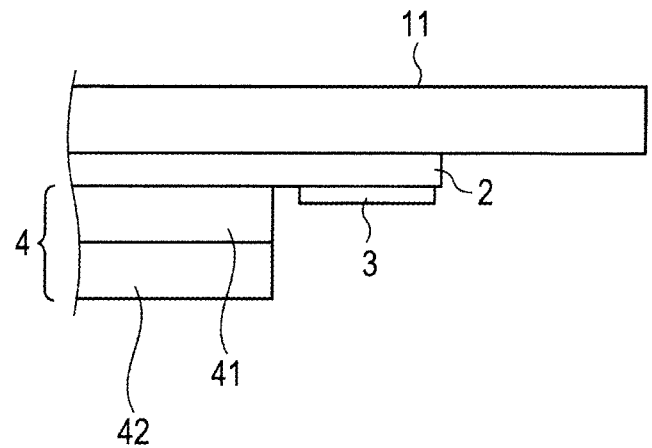
FIG. 11 shows arrangement example 3 of the glass, the touch panel layer, the depression sensor and the display section in the electronic device according to an embodiment of the present invention.

FIG. 11 is a sectional side view of electronic device 1 in arrangement example 3. As shown in FIG. 11, touch panel layer 2 is disposed at a lower face side of glass 11, and depression sensor 3 is disposed at a periphery portion of a lower face side of touch panel layer 2. Further, at a position at the lower face side of touch panel layer 2 and away from depression sensor 3, LCD 41 and backlight 42 are arranged as display section 4. LCD 41 is disposed so as to face touch panel layer 2.

Figure 12:
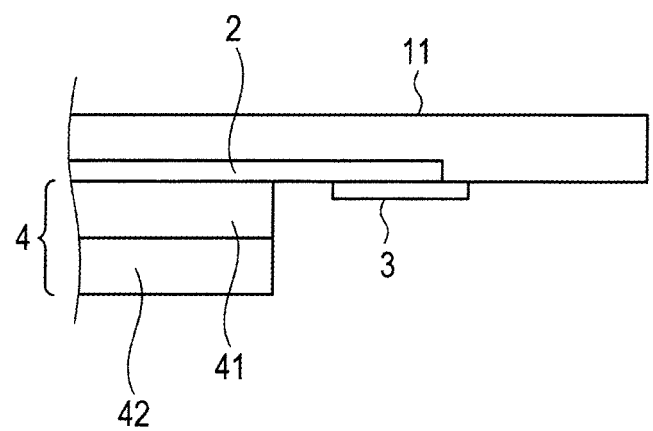
FIG. 12 shows arrangement example 4 of the glass, the touch panel layer, the depression sensor and the display section in the electronic device according to an embodiment of the present invention.

FIG. 12 is a sectional side view of electronic device 1 in arrangement example 4. As shown in FIG. 12, touch panel layer 2 is disposed so as to fit into the lower face side of glass 11. That is, glass 11 and touch panel layer 2 are integrated. Depression sensor 3 is disposed over glass 11 and touch panel layer 2 at a lower face side of glass 11 and touch panel layer 2. Display section 4 is disposed in a similar manner to arrangement example 3 shown in FIG. 11.

Figure 13:
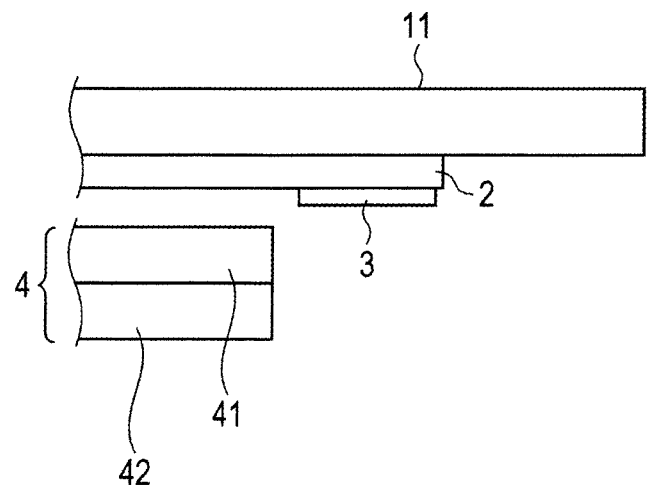
FIG. 13 shows arrangement example 5 of the glass, the touch panel layer, the depression sensor and the display section in the electronic device according to an embodiment of the present invention.

FIG. 13 is a sectional side view of electronic device 1 in arrangement example 5. Arrangement example 5 shown in FIG. 13 is basically the same as arrangement example 3 shown in FIG. 11. A difference is that in arrangement example 5, touch panel layer 2 is disposed at a predetermined distance from LCD 41 of display section 4.

Figure 14:
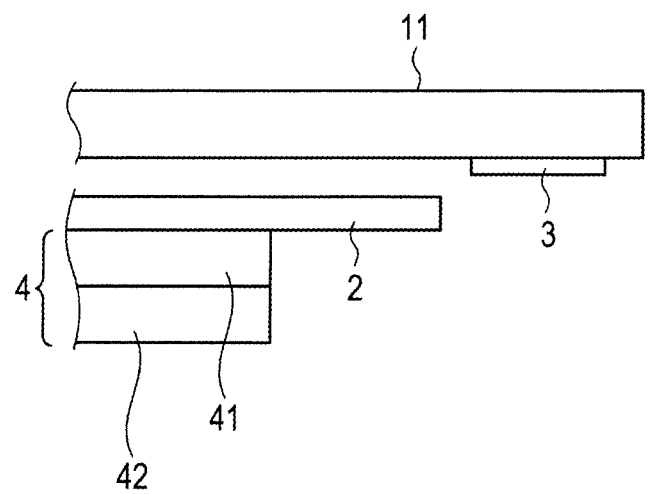
FIG. 14 shows arrangement example 6 of the glass, the touch panel layer, the depression sensor and the display section in the electronic device according to an embodiment of the present invention.

FIG. 14 is a sectional side view of electronic device 1 in arrangement example 6. As shown in FIG. 14, depression sensor 3 is arranged at a periphery portion of the lower face side of glass 11. Touch panel layer 2 is disposed under glass 11 at a predetermined distance from glass 11. Display section 4 is arranged in a similar manner to arrangement example 3 shown in FIG. 11.

In the case of arrangement example 5 shown in FIG. 13 and arrangement example 6 shown in FIG. 14, it is possible to separate display section 4 from glass 11 (for example, by 5 mm to 15 mm). These arrangements are advantageous, for example, to avoid contact of display section 4 with an irregularity or the like of glass 11 when glass 11 has a slight irregularity or a slight curvature and display section 4 is hard. Alternatively, it is also possible to dispose display section 4 inside a side face (for example, a door) of a refrigerator and dispose glass 11 having slight curvature at a position of the side face corresponding to display section 4. Alternatively, it is also possible to dispose display section 4 having a large screen (for example, 50 inches) inside a show window and use a glass of the show window (glass belonging to the building) as glass 11.

Figure 15:
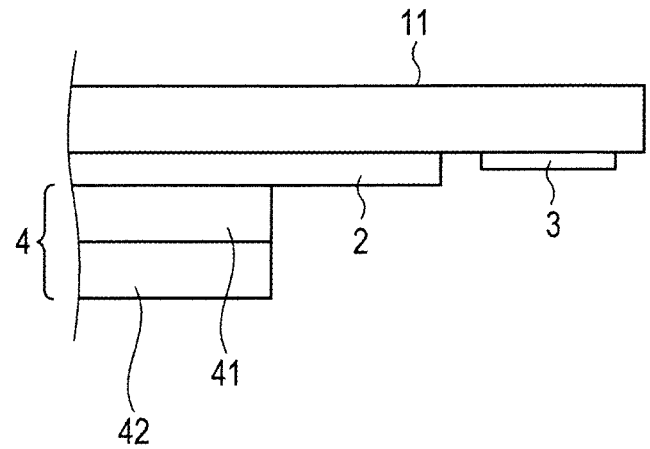
FIG. 15 shows arrangement example 7 of the glass, the touch panel layer, the depression sensor and the display section in the electronic device according to an embodiment of the present invention.

FIG. 15 is a sectional side view of electronic device 1 in arrangement example 7. Arrangement example 7 shown in FIG. 15 is basically the same as arrangement example 6 shown in FIG. 14. A difference is that in arrangement example 7, touch panel layer 2 and glass 11 are arranged without a predetermined distance being provided therebetween.

Figure 16:
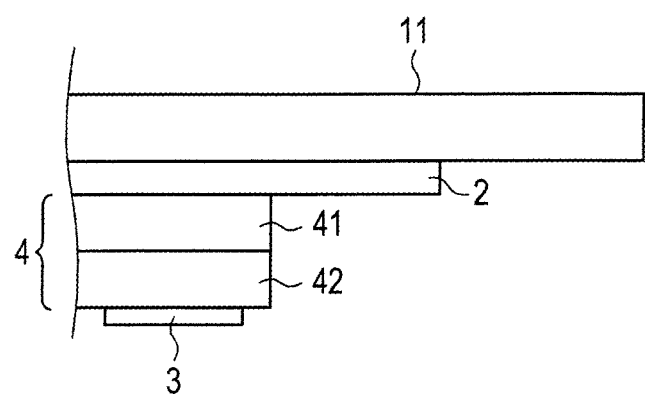
FIG. 16 shows arrangement example 8 of the glass, the touch panel layer, the depression sensor and the display section in the electronic device according to an embodiment of the present invention.

FIG. 16 is a sectional side view of electronic device 1 in arrangement example 8. Arrangement example 8 shown in FIG. 16 is basically the same as arrangement example 3 shown in FIG. 11. A difference is that in arrangement example 8, depression sensor 3 is disposed at a lower face side of backlight 42 instead of being disposed at the lower face side of touch panel layer 2. It should be noted that depression sensor 3 may be arranged at an upper face side of either LCD 41 or backlight 42, at a side face side of either LCD 41 or backlight 42 or inside of either LCD 41 or backlight 42.

Figure 17:
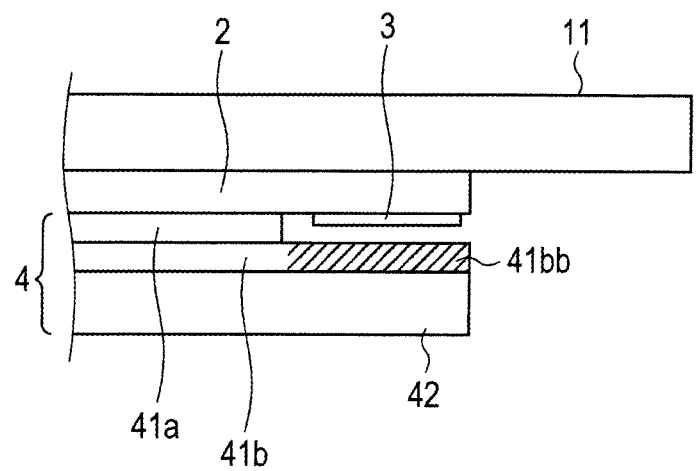
FIG. 17 shows arrangement example 9 of the glass, the touch panel layer, the depression sensor and the display section in the electronic device according to an embodiment of the present invention.

FIG. 17 is a sectional side view of electronic device 1 in arrangement example 9. As shown in FIG. 17, display section 4 includes at least a sheet-like transparent member 41a and a transparent member 41b disposed while being overlapped with transparent member 41a, and liquid crystals are held between transparent member 41a and transparent member 41b.

Further, as shown in FIG. 17, transparent member 41a is disposed at the lower face side of touch panel layer 2, and transparent member 41b is disposed at a lower face side of transparent member 41a. Further, part of transparent member 41b, which is end portion 41bb of display section 4, protrudes outward from transparent member 41a. Depression sensor 3 is arranged at a portion corresponding to protruding end portion 41bb of transparent member 41b at the lower face side of touch panel layer 2.

According to this arrangement example 9, because depression sensor 3 is disposed at the portion corresponding to protruding end portion 41bb of transparent member 41b, it is not necessary to prepare new space for arranging depression sensor 3, and allows efficient use of the space in electronic device 1.

Figure 18:
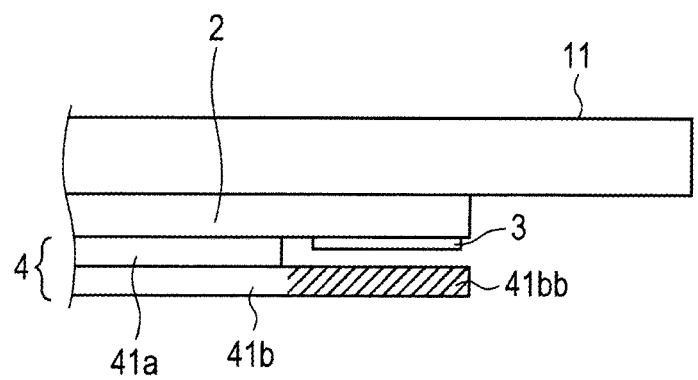
FIG. 18 shows arrangement example 10 of the glass, the touch panel layer, the depression sensor and the display section in the electronic device according to an embodiment of the present invention.

FIG. 18 is a sectional side view of electronic device 1 in arrangement example 10. Arrangement example 10 shown in FIG. 18 is basically the same as arrangement example 9 shown in FIG. 17. A difference is that in arrangement example 10, backlight 42 is not provided. Accordingly, in this arrangement example 10, display section 4 has a configuration which can display images without the need of a backlight (for example, organic EL (electroluminescence)).

In this arrangement example 10, because depression sensor 3 is disposed at the portion corresponding to protruding end portion 41bb of transparent member 41b as with the above arrangement example 9, it is not necessary to prepare new space for disposing depression sensor 3, and it is possible to efficiently utilize space inside electronic device 1.

INDUSTRIAL APPLICABILITY

The present invention is useful for techniques (for example, apparatuses, systems, methods, programs, or the like) which use an electrostatic-capacitance touch panel.

REFERENCE SIGNS LIST

1 Electronic device
2 Touch panel layer
3 Depression sensor
4 Display section
5 Storage section
6 Control section
10 Housing
11 Glass
12 Frame portion
23 Recessed portion
30 Icon
41 LCD
42 Backlight
70 Finger
71 Glove
80, 81 Water droplet

The invention claimed is:

1. An electronic device comprising:
a housing;
a display section that is disposed inside the housing and that is capable to show contents;
an electrostatic-capacitance touch panel section that allows visible light corresponding to display contents of the display section to pass through the touch panel section and that is capable to determine a two-dimensional coordinate indicated by an indicator having predetermined conductivity;
a transparent member that protects the touch panel section and that allows visible light corresponding to the contents of the display section to pass through the transparent member; and
a depression detecting section that detects deformation of the transparent member, wherein:
if a plurality of two-dimensional coordinates are determined in order by the touch panel section and, after determining the two-dimensional coordinates, a predetermined amount of deformation is detected by the depression detecting section,
then a latest two-dimensional coordinate on the basis of a time point when the predetermined amount of deformation has been detected is validated among the plurality of two-dimensional coordinates; and
one or more two-dimensional coordinates other than the validated two-dimensional coordinate are not validated among the plurality of two-dimensional coordinates.

2. The electronic device according to claim 1, wherein the validation of the two-dimensional coordinate is maintained until an indicator which indicates the validated two-dimensional coordinate moves away from the touch panel section at a predetermined distance.

3. The electronic device according to claim 1, wherein, when a vertical distance between the indicator and the touch panel section is equal to or less than a predetermined value, the two-dimensional coordinate indicated by the indicator is determined.

4. The electronic device according to claim 3, wherein the predetermined value is zero.

5. The electronic device according to claim 1, wherein the depression detecting section is disposed between the display section and part of the housing.

6. The electronic device according to claim 1, wherein the transparent member and the touch panel section are integrated into one piece.

7. The electronic device according to claim 1, wherein at least part of the depression detecting section is overlapped with the display section.

8. The electronic device according to claim 1, wherein the depression detecting section and the touch panel section are integrated into one piece.

9. A coordinate detecting method for an electronic device that includes: a housing; a display section that is disposed inside the housing and that is capable to show contents; an electrostatic-capacitance touch panel section that allows visible light corresponding to the contents of the display section to pass through the touch panel section and that is capable to determine a two-dimensional coordinate indicated by an indicator having predetermined conductivity; a transparent member that protects the touch panel section and that allows visible light corresponding to the contents of the display section to pass through the transparent member; and a depression detecting section that detects deformation of the transparent member, the method comprising:
when a plurality of two-dimensional coordinates are determined in order by the touch panel section and, after determining the two-dimensional coordinates, a predetermined amount of deformation is detected by the depression detecting section,
then validating a latest two-dimensional coordinate on the basis of a time point when the predetermined amount of deformation has been detected, among the plurality of two-dimensional coordinates; and
not validating one or more two-dimensional coordinates other than the validated two-dimensional coordinate, among the plurality of two-dimensional coordinates.

10. The electronic device according to claim 1, wherein:
the validation of the two-dimensional coordinate is maintained until the indicator which indicates the validated two-dimensional coordinate moves away from the touch panel section at a predetermined distance, and
a two-dimensional coordinate determined after the validation is not validated.

11. The electronic device according to claim 3, wherein the predetermined value is more than zero.

* * * * *